United States Patent
Gordon et al.

(10) Patent No.: US 12,460,961 B2
(45) Date of Patent: Nov. 4, 2025

(54) SURFACE ACOUSTIC WAVE SCALE

(71) Applicant: Circuits & Systems, Inc., East Rockaway, NY (US)

(72) Inventors: Arnold Gordon, Woodmere, NY (US); Li Feng, Plainview, NY (US)

(73) Assignee: Circuits & Systems, Inc., East Rockaway, NY (US)

( * ) Notice: Subject to any disclaimer, the term of this patent is extended or adjusted under 35 U.S.C. 154(b) by 334 days.

(21) Appl. No.: 18/002,699

(22) PCT Filed: Jul. 6, 2021

(86) PCT No.: PCT/US2021/040485
§ 371 (c)(1),
(2) Date: Dec. 21, 2022

(87) PCT Pub. No.: WO2022/010879
PCT Pub. Date: Jan. 13, 2022

(65) Prior Publication Data
US 2023/0243692 A1     Aug. 3, 2023

Related U.S. Application Data

(60) Provisional application No. 63/048,931, filed on Jul. 7, 2020.

(51) Int. Cl.
*G01G 3/16* (2006.01)
*G01G 3/13* (2006.01)
*G01G 3/18* (2006.01)

(52) U.S. Cl.
CPC ............... *G01G 3/16* (2013.01); *G01G 3/13* (2013.01); *G01G 3/18* (2013.01)

(58) Field of Classification Search
CPC .. G01G 3/16; G01G 3/13; G01G 3/18; G01G 3/14
(Continued)

(56) References Cited

U.S. PATENT DOCUMENTS 4,336,854 A     6/1982  Jensen
5,364,797 A  *  11/1994  Olson ............... G01N 33/54373
                                                436/103
(Continued)

OTHER PUBLICATIONS

PCT Search Report and Written Opinion dated Nov. 4, 2021 of Application No. PCT/US 21/40485.

*Primary Examiner* — Jacques M Saint Surin
(74) *Attorney, Agent, or Firm* — Gordon & Jacobson, P.C.

(57) ABSTRACT

Surface acoustic wave (SAW) weighing apparatus and related methods are provided for measuring weight of a load employing a displaceable elastic member that is displaced by the load. A piezoelectric SAW transducer is coupled to the elastic member. The piezoelectric transducer along with an amplifier electrically coupled thereto form a delay line oscillator circuit that is configured to generate an oscillating signal in response to displacement of the elastic member by the weight of the load. A magnet is spaced from a Hall effect sensor. The magnet produces a magnetic field, and the Hall effect sensor is configured to measure strength of the magnetic field which is related to displacement of the elastic member and the weight of the load. Circuitry generates frequency data that characterizes frequency of the oscillating signal. The frequency data is related to displacement of the elastic member and the weight of the load.

18 Claims, 8 Drawing Sheets

(58) Field of Classification Search
USPC .................................................. 177/25.13
See application file for complete search history.

(56) References Cited

U.S. PATENT DOCUMENTS

| | | | |
|---|---|---|---|
| 5,442,146 A | 8/1995 | Bell et al. | |
| 5,663,531 A | 9/1997 | Kats | |
| 5,850,057 A * | 12/1998 | Veillette | G01G 23/10 |
| | | | 177/185 |
| 5,910,647 A | 6/1999 | Kats et al. | |
| 6,448,513 B1 * | 9/2002 | Kats | G01G 3/13 |
| | | | 331/65 |
| 6,774,624 B2 * | 8/2004 | Anderson | A61B 5/06 |
| | | | 324/207.17 |
| 6,812,413 B1 * | 11/2004 | Kats | G01G 3/13 |
| | | | 177/210 R |
| 7,497,137 B2 * | 3/2009 | Tellenbach | G01G 23/3728 |
| | | | 177/1 |
| 8,321,173 B2 * | 11/2012 | Wallance | G06F 3/046 |
| | | | 702/186 |
| 9,477,638 B2 | 10/2016 | Kats | |
| 11,215,499 B1 * | 1/2022 | Polish | G01D 18/00 |
| 11,320,298 B2 * | 5/2022 | Kats | G01G 3/165 |
| 2004/0065485 A1 | 4/2004 | Kats et al. | |
| 2013/0185011 A1 | 7/2013 | Kats | |
| 2019/0033123 A1 | 1/2019 | Kats | |

* cited by examiner

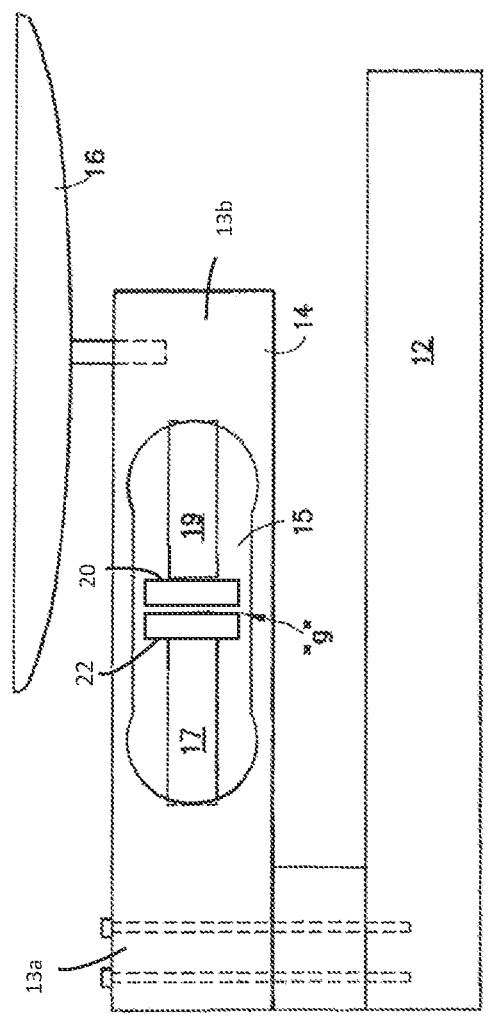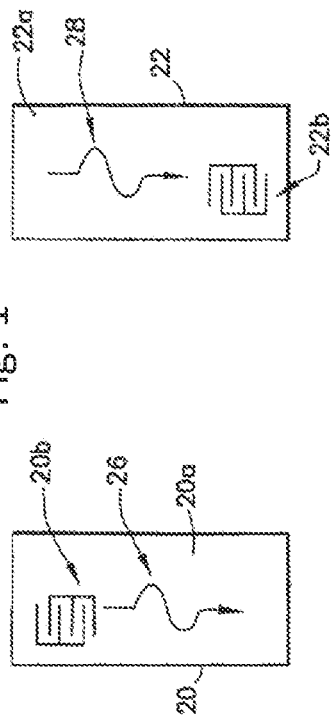

SURFACE ACOUSTIC WAVE SCALE

BACKGROUND

1. Field

The present disclosure relates to electronic weighing devices or scales, and more particularly to electronic weighing devices that employ surface acoustic waves to measure weight.

2. State of the Art

Electronic weighing devices (also commonly referred to as electronic scales) are widely known in the art and there are many different technologies utilized in these electronic weighing devices. Laboratory scales or "balances" typically have a capacity of about 1,200 grams and a resolution of about 0.1 gram, although scales with the same resolution and a range of 30,000 grams are available. The accuracy of these scales is achieved through the use of a technology known as magnetic force restoration. Generally, magnetic force restoration involves the use of an electromagnet to oppose the weight on the scale platform. The greater the weight on the platform, the greater the electrical current needed to maintain the weight. While these scales are very accurate (up to one part in 120,000), they are expensive and very sensitive to ambient temperature. In addition, their range is relatively limited.

Most all other electronic weighing devices use load strain-gauge cell technology. In load cell scales, the applied weight bends an elastic member which has strain gauges bonded to its surface. The strain gauge is a fine wire which undergoes a change in electrical resistance when it is either stretched or compressed. A measurement of this change in resistance yields a measure of the applied weight. Load cell scales are used in non-critical weighing operations and usually have a resolution of about one part in 3,000. The maximum resolution available in a load cell scale is about one part in 10,000 which is insufficient for many critical weighing operations. However, load cell scales can have a capacity of several thousand pounds.

Other electronic scales employ piezoelectric transducers that transmit and receive surface acoustic waves ("SAWs"). These scales typically include a cantilevered elastic member upon which a load platform is mounted. The elastic member is provided with first and second piezoelectric transducers that are separated from one another by a small gap. The piezoelectric transducers each include a pair of interdigitated electrodes formed on a corresponding piezoelectric substrate. An amplifier is operably coupled between the first and second piezoelectric transducers. The output of the amplifier is supplied to the interdigitated electrodes of the first piezoelectric transducer, which causes the first piezoelectric transducer to function as a transmitter and emit a SAW which propagates along the surface of the piezoelectric substrate of the first piezoelectric transducer. This propagating SAW is transmitted over the gap between the first and second piezoelectric transducers and induces a similar propagating SAW along the surface of the second piezoelectric transducer. The second piezoelectric transducer functions as a receiver transducer that generates an oscillating voltage signal in the interdigitated electrodes of the second piezoelectric transducer which is induced by the propagating SAW traveling along the surface of the piezoelectric substrate of the second piezoelectric transducer. The oscillating voltage signal produced by the second piezoelectric transducer is supplied as an input to the amplifier. In this manner, the first and second piezoelectric transducers form a "delay line" and the resulting circuit acts as a natural oscillator with the output of the amplifier having a particular frequency which depends on the physical characteristics of the first and second piezoelectric transducers and their distance therebetween.

When a load is applied to the load platform for weight measurement, the cantilevered elastic member moves downward and causes the first and second piezoelectric transducer to be displaced relative to one another. Such relative displacement causes a change in the frequency at the output of the amplifier. The relative displacement is proportional to the weight of the applied load and the frequency and/or change in frequency at the output of the amplifier can be calibrated to the relative displacement and the weight of the applied load.

Weighing accuracy can be affected by changes in phase linearity of the delay line oscillator due to environmental conditions such as temperature and humidity. Phase linearity represents the linear relationship between the frequency response of the delay line oscillator of the system and the relative displacement of the piezoelectric transducers. In order to overcome some of these issues, co-owned application Ser. No. 09/775,748 (U.S. Pat. No. 6,448,513) discloses one aspect that uses a "push oscillator" coupled to the input of the amplifier for injecting a strong RF signal at a frequency in the middle of the oscillation mode which exhibits best phase linearity. The frequency of the "push oscillator" can be determined experimentally when the system is calibrated. The RF signal can be injected periodically preferably in short bursts. According to a second aspect of the same patent, the frequency of the "push oscillator" is determined by mixing a temperature-humidity-dependent oscillating signal with an adjustable fixed frequency oscillating signal. The temperature-humidity-dependent oscillating signal can be derived from a pair of piezoelectric transducers, such as ones that are formed on the piezoelectric substrate of the first piezoelectric transducer (transmitter). The temperature-humidity-dependent oscillating signal can be used to adjust the frequency of the "push oscillator" in a manner that accounts for the effects of temperature and humidity on the first and second piezoelectric transducers, but does not account for temperature effects on other parts of the system, such as the Young's modulus of the elastic member. Furthermore, a thermistor is provided and used for periodic calibration of the system to account for temperature effects on the other parts of the system.

Note that the frequency response of the delay line oscillator of the system is represented by a series of modes. Thus, as the frequency of the oscillating signal changes, the modes move through the frequency response curve and are separated from each other by a phase shift of $2\pi$. The first and second piezoelectric transducers can be arranged such that the relative displacement over the weight range of the scale causes the oscillating signal to oscillate in more than one mode. Therefore, the change in frequency of the oscillating signal as plotted against displacement of the piezoelectric transducers is a periodic function. The cycles of the periodic function correspond to the different modes of the frequency response of the delay line oscillator of the system.

There are several different ways of determining the mode of the frequency response of the delay line oscillator of the system. In one embodiment, an auxiliary capacitive sensor is used to determine the mode of the frequency response of the delay line circuit of the system. The relationship between the output signal produced by the capacitive sensor and the different modes of the frequency response of the delay line circuit of the system is determined by calibration with known weights. Despite all of the advances, there still remain situations where the auxiliary capacitive sensor drifts sufficiently to cause ambiguity as to the current mode of the frequency response of the delay line circuit of the system. Such drift can be due to temperature, humidity, and time. If such drift is significant, the system can incorrectly determine the mode of the frequency response of the delay line circuit, which can result in large errors in weight determination.

SUMMARY

Surface acoustic wave (SAW) weighing apparatus and related methods are provided for measuring weight of a load. The apparatus and methods employ a displaceable elastic member that is displaced by the load such that displacement of the elastic member is related to the weight of the load. A first piezoelectric transducer is coupled to the elastic member. The first piezoelectric transducer includes a first surface SAW transmitter spaced from a first SAW receiver. A first amplifier is electrically coupled to the first piezoelectric transducer. The first amplifier has an input and an output where the input is electrically coupled to the first SAW receiver and the output is electrically coupled to the first SAW transmitter. The first SAW receiver, the first amplifier and the first SAW transmitter form a first delay line oscillator circuit that is configured to generate a first oscillating signal in response to displacement of said elastic member. A magnet is spaced from a Hall effect sensor. The magnet is configured to produce a magnetic field, and the Hall effect sensor is configured to measure strength of the magnetic field which is related to displacement of the elastic member and the weight of the load. Circuitry is operably coupled to the first delay line oscillator circuit and configured to generate first frequency data that characterizes frequency of the first oscillating signal. The first frequency data is related to displacement of the elastic member and the weight of the load. A processor is operably coupled to the circuitry and the Hall effect sensor. The processor is configured to store calibration data for the electronic weighing apparatus and determine the weight of the load from at least the strength of the magnetic field measured by the Hall effect sensor, the calibration data and the first frequency data.

In embodiments, the apparatus can further include at least one additional piezoelectric transducer that has a second SAW transmitter spaced at a fixed distance from a second SAW receiver. The additional piezoelectric transducer(s) can be electrically coupled between the input and output of a second amplifier to form a second delay line oscillator circuit that is configured to generate a second oscillating signal. Circuitry is operably coupled to the second delay line oscillator circuit and configured to generate second frequency data that characterizes frequency of said second oscillating signal, wherein the second frequency data is related to secondary factors including at least one environmental condition. The processor can be configured to determine the value of a correction factor or parameter from the second frequency data and use the value of the correction factor or parameter to determine the weight of the load in a manner that accounts for the at least one environmental condition.

In embodiments, the apparatus can further include a temperature sensor that measures temperature data that characterizes ambient temperature. The processor can be configured to use the temperature data to determine the value of a correction factor or parameter from the temperature data and use the value of the correction factor or parameter to determine the weight of the load in a manner that accounts for temperature effect on the elastic member.

In embodiments, the apparatus can further include a push oscillator that is coupled to processor and to the first delay line oscillator circuit. The push oscillator can be configured to initiate oscillation of the first delay line oscillator circuit.

In embodiments, the first oscillating signal of the first delay line oscillator circuit is within one mode of a plurality of modes that share frequencies, and the processor is configured to store a mapping function that relates data based on strength of the magnetic field as measured by the Hall effect sensor and the plurality of modes and use the mapping function to determine the one mode given the strength of the magnetic field measured by the Hall effect sensor.

In embodiments, the processor can be configured to store calibration data for the plurality of modes, load particular calibration data for the one mode as determined from the strength of the magnetic field measured by the Hall effect sensor, and use the particular calibration data to determine the weight of the load from at least the particular calibration data and the first frequency data.

In embodiments, the Hall effect sensor can be configured to measure strengths of two axial magnetic field components that are orthogonal to one another. The mapping function stored by the processor can be configured to relate variable estimated weight based on strength of the two axial magnetic field component measured by the Hall effect sensor and the plurality of modes. The processor can be further configured to determine as estimated weight given the two axial magnetic field component measured by the Hall effect sensor and use the mapping function to determine the one mode given the estimated weight.

In embodiments, the Hall effect sensor can be mounted on a surface of a holder (or other mounting structure) and the two axial magnetic field components measured by the Hall effect sensor can be parallel to the surface of the holder.

In embodiments, the mapping function can be generated by calibration operations that determine the two axial magnetic field component measured by the Hall effect sensor for a load of known weight. The apparatus can further include a platform for supporting the load wherein the platform is coupled to elastic member. The calibration operations can be performed to determine the two axial magnetic field component measured by the Hall effect sensor for different positions of the load of known weight on the platform.

In embodiments, the mapping function can involve a parameter that combines the two axial magnetic field component measured by the Hall effect sensor. In embodiments, the processor can be configured to determine the weight of the load from the strengths of the two axial magnetic field components measured by the Hall effect sensor in order to account for offset of the load.

In embodiments, the first oscillating signal of the first delay line oscillator circuit is within one mode of a plurality of modes that share frequencies. The processor can be configured to determine a first-order weight of the load based on parameters of at least one stored calibration curve, identify the one mode based on measurements of magnetic field performed by the Hall effect sensor, and apply mode correction to the first-order weight according to the identified one mode to determine the weight of the load. In embodiments, the stored calibration curve(s) can be determined from calibration operations that determine at least frequency of the first oscillating signal for loads of different known weights and varying environmental conditions.

In embodiments, the magnet and Hall effect sensor can be mounted on opposed holders (or other mounting structures) that are offset from one another by a gap. The first SAW transmitter and the first SAW receiver can include interdigitated electrodes that are formed on piezoelectric substrates that are also mounted on the opposed holders.

In embodiments, the processor can be configured to determine whether the first delay line oscillator circuit is operating in a predefined desired mode based on the measurements of magnetic field performed by the Hall effect sensor, and selectively control the push oscillator to inject an oscillating voltage signal into the first delay line oscillator circuit such that first delay line oscillator circuit operates in the predefined desired mode in the event that the first delay line oscillator circuit is not operating in the predefined desired mode.

In embodiments, the processor can store calibration data that relates measurements of magnetic field performed by the Hall effect sensor to predefined desired modes of the first delay line oscillator circuit and access such calibration data to determine whether the first delay line oscillator circuit is operating in the predefined desired mode corresponding to the measurements of magnetic field performed by the Hall effect.

In embodiments, one or more circuit elements of the apparatus (such frequency detection circuitry, a push oscillator circuit, data buffer circuitry and control input/output circuitry) can be implemented by a field programmable gate array.

BRIEF DESCRIPTION OF THE DRAWINGS

FIG. 1 is a schematic side elevation view of an exemplary embodiment of an electronic weighing apparatus according to the present disclosure;

FIG. 2A is an enlarged schematic plan view of a piezoelectric SAW transmitter transducer which is part of the electronic weighing apparatus of FIG. 1;

FIG. 2B is an enlarged schematic plan view of a piezoelectric SAW receiver transducer which is part of the electronic weighing apparatus of FIG. 1;

DETAILED DESCRIPTION OF THE EMBODIMENTS

Figure 3A:
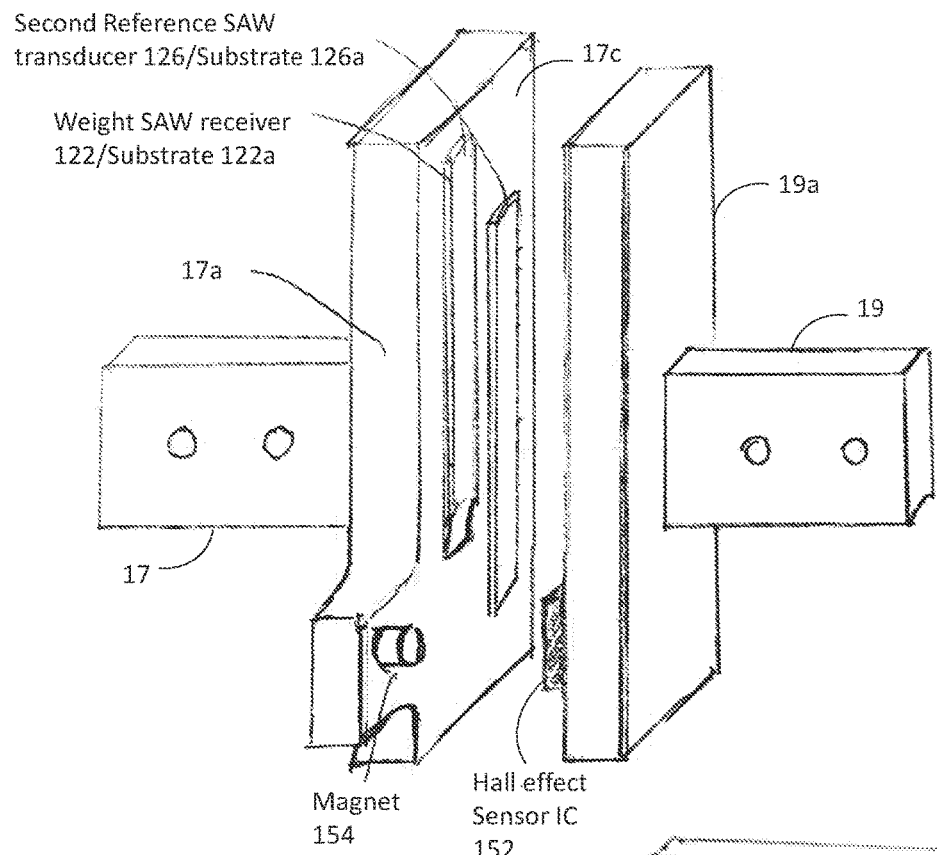
FIG. 3A is schematic side view of components that are mounted to opposed holders supported by the elastic member of the electronic weighing apparatus of FIG. 1.
Figure 3B:
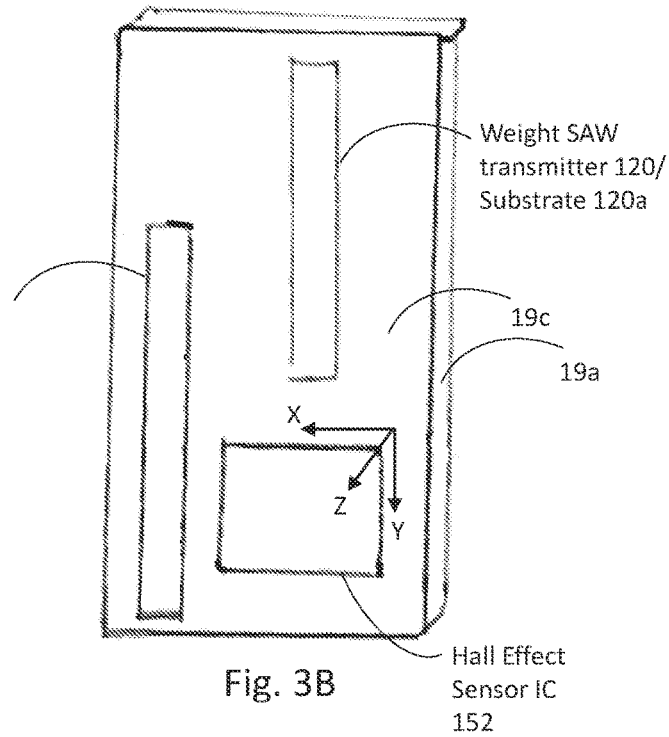
FIG. 3B is a plan view of components that are mounted to one of the holders of FIG. 3A.

Referring now to FIGS. 1, 2A and 2B, an electronic weighing apparatus or scale 10 includes a base 12 which supports one end 13a of a cantilevered elastic member 14. A load platform 16 is mounted to the opposite end 13b of the cantilevered elastic member 14. The elastic member 14 has a cut-out 15 disposed along the central axis of the elastic member 15. The cut-out 15 is provided with two opposed posts 17, 19 where post 17 is rigidly coupled to fixed end 13a of the elastic member 14 (or the base 12) and post 19 is rigidly coupled to the elastic member 14. A first holder 19a is supported by post 19, and a second holder 17a is supported by post 17. A first piezoelectric transducer 20 is mounted to the first holder 19a and thus supported by post 19. A second piezoelectric transducer 22 is mounted to the second holder 17a and thus supported by the post 17. The posts 19, 17 and holders 19a, 17a serve to locate the first and second piezoelectric transducers 20, 22 at or near the center of the elastic member 14.

The first piezoelectric transducer 20 includes a pair of interdigitated electrodes 20b formed on a piezoelectric substrate 20a. The second piezoelectric transducer 22 includes a pair of interdigitated electrodes 22b formed on a piezoelectric substrate 22a. The first and second piezoelectric transducers 20, 22 are separated from one another by a small gap "g" (air). An amplifier (not shown) is operably coupled between the first and second piezoelectric transducers 20, 22. The output of the amplifier is supplied to the interdigitated electrodes 20b of the first piezoelectric transducer 20, which causes the first piezoelectric transducer 20 to function as a transmitter and emit a SAW which propagates along the surface of the piezoelectric substrate 20a of the first piezoelectric transducer 20. This propagating SAW is transmitted over the gap "g" between the first and second piezoelectric transducers 20, 22 and induces a similar propagating SAW along the surface of the piezoelectric substrate 22a of the second piezoelectric transducer 22. The second piezoelectric transducer 22 functions as a receiver transducer that generates an oscillating voltage signal in the interdigitated electrodes 22b of the second piezoelectric transducer 22 which is induced by the propagating SAW traveling along the surface of the piezoelectric substrate 22a of the second piezoelectric transducer 22. The oscillating voltage signal produced by the second piezoelectric transducer 22 is supplied as an input to the amplifier. In this manner, the first and second piezoelectric transducers 20, 22 form a "delay line" and the gain of the amplifier is configured to be larger than the loss of the system such that the resulting circuit acts as a natural oscillator with the output of the amplifier producing an oscillating voltage signal having a particular frequency which depends on the physical characteristics of the first and second piezoelectric transducers 20, 22 and their distance relative to each other. In particular, the frequency of the oscillating voltage signal produced by the output of the amplifier of the delay line oscillator is directly related to the time it takes for the SAW to propagate from the electrodes 20b of the first piezoelectric transducer 20 to the electrodes 22b of the second piezoelectric transducer 22.

In embodiments, the elastic member 14 can be is made of aluminum or steel. In one embodiment, the elastic member can exhibit a maximum displacement of 0.1 to 0.2 mm at maximum load.

When a load is applied to the load platform 16 for weight measurement, the cantilevered elastic member 14 moves downward and causes the first piezoelectric transducer 20 to be displaced relative to the second piezoelectric transducer 22. The relative displacement of the first and piezoelectric transducers 20, 22 causes a change in the frequency of the oscillating signal produces at the output of the amplifier. Such relative displacement is proportional to the weight of the applied load and the frequency (and the change in frequency) at the output of the amplifier can be calibrated to the relative displacement of the first and second piezoelectric transducers 20, 22 and the weight of the applied load.

The frequency response of the oscillating voltage signal produced by the output of the amplifier over the operating load range of the scale can be represented by a periodic sawtooth profiled curve (see FIG. 6), where the different tooth's of the curve are defined by distinct frequency ranges and correspond to different modes of the delay line oscillator of the system. Thus, as the frequency of the oscillating voltage signal changes due to different load conditions, the modes can move through the sawtooth profile of the curve. Importantly, because of the sawtooth profile of the curve, the frequency response over the operating load range of the scale includes the same frequencies generated at different displacements of the elastic member such that a weight determination cannot be made unless the mode is known. Thus, weight determination based on the frequency of the oscillating voltage signal requires determination of the mode of the delay line oscillator of the system, i.e., which tooth of the curve the delay line oscillator is operating in.

According to one aspect of the present disclosure and described in more detail below, a combination of Hall-effect sensor and magnet are provided to measure estimated weight of a load applied to the scale, and such estimated weight can be related to the different modes of the delay line oscillator of the system by a mapping function determined by a calibration procedure.

In embodiments, a magnet and Hall effect sensor integrated circuit (IC) are supported on opposite sides of the gap "g" between the first and second piezoelectric transducers. The magnet produces a magnetic field directed across the gap for detection by the Hall effect sensor IC. The magnet can be a permanent magnet, magnet array or other suitable source of the magnetic field. When a load is applied to the load platform 16 for weight measurement, the cantilevered elastic member 14 moves downward and causes relative displacement between the magnet and the Hall effect sensor IC. The relative displacement of the magnet and the Hall effect sensor IC causes a change in the magnetic field strength measured by the Hall effect sensor IC. Calibration operations can be carried out to correlate the magnetic field strength (or change therein) as measured by the Hall effect sensor IC to the different modes of the frequency response of the delay line oscillator of the system so that the mode of the delay line oscillator can be determined. In other words, and as will be discussed in more detailed below, different loads on the platform 16 can produce the same frequency in the delay line oscillator such that a weight determination cannot be made unless the mode is known. Because the magnetic field strength (or change therein) as measured by the Hall effect sensor IC has a one-to-one correspondence to weight (i.e., it does not have multiple modes), it provides information to permit automatic determination of the mode of the delay line oscillator.

In embodiments, the Hall effect sensor IC is supported on a vertical mounting surface of one of the holders 19a, 17a and can be configured to measure axial magnetic field strength in at least two different axes referred to as "Y axis" and the "X-axis" that extend parallel to the mounting surface. The Y-axis extends vertically downward parallel to the downward direction of the relative displacement of the piezoelectric transducers. The X-axis is orthogonal to the Y-axis and extends generally parallel to the piezoelectric transducer surfaces that support the propagation of the SAW waves transmitted and received by the piezoelectric transducers. The Hall effect sensor IC can possibly be configured to measure magnetic field strength in the Z axis if need be. The Z axis is orthogonal to both the Y and X axes and extends in a direction across the gap toward the magnet.

In embodiments, the calibration operations of the Hall effect sensor IC can be logically organized into two parts referred to herein as off-center calibration and span calibration.

The off-center calibration can involve placing an arbitrary known weight Wk in each one of the four corners of the platform 16 of the scale. The known weight Wk can be a fairly large percentage (e.g., over 50%) of the maximum weight capacity of the scale. With the weight Wk placed in each corner, the Hall effect sensor IC can be configured to measure and record the magnetic field strength in the Y-axis (which can be denoted "y") and the magnetic field strength in the X-axis (which can be denoted "x"). The known weight Wk can be related to the "x" and "y" measurements by a linear relationship as follows:

$$Wk=(a*x)+y. \qquad \text{Eqn. (1)}$$

In this case, the parameter "a" is unknown and can be solved separately for each one of the four readings. The four values of "a" can be averaged to obtain the final value of the parameter "a". In other embodiments, the parameter "a" can be solved from one or more measurements of the magnetic field strength in the Y-axis (which can be denoted "y") and the magnetic field strength in the X-axis (which can be denoted "x") with a known weight Wk placed on the scale.

The span calibration operations can be based on a parameter (referred to herein as "Magnetic Field Count" or "MFC") that combines the magnetic field strength in the Y-axis and the magnetic field strength in the X-axis as measured by the Hall effect sensor IC similar to the relationship of Eqn. (1). In embodiments, the MFC parameter can be related to the magnetic field strength in the Y-axis and the magnetic field strength in the X-axis as measured by the Hall effect sensor IC as follows:

$$MFC=(a*x)+y, \qquad \text{Eqn. (2)}$$

where MFC is the value of the MFC parameter,
"y" is the magnetic field strength in the Y-axis as measured by the Hall effect sensor IC,
"x" is the magnetic field strength in the X-axis as measured by the Hall effect sensor IC, and
"a" is the parameter that is solved for by the calibration operations using known weight.

More specifically, with no weight on the platform 16, the Hall effect sensor IC can be configured to measure and record the magnetic field strength in the Y-axis (which can be denoted "$y_0$") and the magnetic field strength in the X-axis (which can be denoted "$x_0$"). The MFC parameter ($MFC_0$) can be related to the magnetic field strength in the Y-axis and the magnetic field strength in the X-axis as measured by the Hall effect sensor IC as follows:

$$MFC_0=(a*x_0)+y_0,\quad\text{Eqn. (3a)}$$

where $MFC_0$ is the value of the MFC parameter with no weight on the platform 16,
"$y_0$" is the magnetic field strength in the Y-axis as measured by the Hall effect sensor IC with no weight on the scale,
"$x_0$" is the magnetic field strength in the X-axis as measured by the Hall effect sensor IC with no weight on the scale, and
"a" is an unknown parameter that is solved for by the calibration operations.

With a known weight $W_f$ at or near the full weight capacity on the platform 16, the Hall effect sensor IC can be configured to measure and record the magnetic field strength in the Y-axis (which can be denoted "$y_f$") and the magnetic field strength in the X-axis (which can be denoted "$x_f$"). The MFC parameter ($MFC_f$) can be related to the magnetic field strength in the Y-axis and the magnetic field strength in the X-axis as measured by the Hall effect sensor IC as follows:

$$MFC_f=(a*x_f)+y_f,\quad\text{Eqn. (3b)}$$

where $MFC_f$ is the value of the MFC parameter with the weight $W_f$ on the scale,
"$y_f$" is the magnetic field strength in the Y-axis as measured by the Hall effect sensor IC with the weight $W_f$ on the scale,
"$x_f$" is the magnetic field strength in the X-axis as measured by the Hall effect sensor IC with the weight $W_f$ on the scale, and
"a" is an unknown parameter that is solved for by the calibration operations.

A span value S (e.g., in units of lbs/count) of the Hall effect sensor IC can be determined as:

$$S=W_f/(MFC_f-MFC_0).\quad\text{Eqn. (4)}$$

An estimate of an unknown weight W' on the platform 16 can be determined from the span value S and the magnetic field strengths x, y in the Y-axis and the X-axis as measured by the Hall effect sensor IC as follows:

$$W'=\{MFC'-MFC_0\}*S=\{[a*x]+y-MFC_0\}*S\quad\text{Eqn. (5)}$$

where MFC' is the value of the MFC parameter with the unknown weight on the scale,
$MFC_0$ is the value of the MFC parameter with no weight on the scale,
S is the span value S given by Eqn. (4),
"y" is the magnetic field strength in the Y-axis as measured by the Hall effect sensor IC with the unknown weight on the scale,
"x" is the magnetic field strength in the X-axis as measured by the Hall effect sensor IC with the unknown weight on the scale, and
"a" is an unknown parameter that is solved for by the calibration operations.

Thus, Eqn. (5) can be used to determine an estimated weight W' for any unknown weight (up to the full weight capacity of the scale) from the span value S and the magnetic field strengths x, y in the Y-axis and the X-axis as measured by the Hall effect sensor IC.

For example, consider a scale with a 100 lb weight capacity. If $MFC_0$ is 200 counts and $MFC_f$ (at the 100 lb capacity) is 1800 counts, then the span value is 100/(1800−200) lb/count=0.0625 lb/count. If the MFC for an unknown weight (MFC'=(a*x)+y) is 1000 counts, then the estimated weight W' can be determined as $\{MFC'-MFC_0\}*S=(1000-200)*0.0625=50$lb.

In embodiments, a mapping (or other functional relationship) can be generated between values of estimated weight W' (based on magnetic field strength measurements of the Hall effect sensor IC) and the modes of the delay line oscillator of the scale during operation. The mapping can be stored in electronic memory and used to determine the mode of the delay line oscillator of the system during operation from a value of estimated weight W' (which is based on magnetic field strength measurements of the Hall effect sensor IC).

For example, each SAW scale can have a known "mode weight" which is the amount of weight encompassed in each saw-tooth or mode of the frequency response of the delay line oscillator of the scale. For example, consider a SAW scale with 5 modes and a 100 lb weight capacity. In this case, the mode weight $W_m$ will be approximately 100 lb/5 modes or 20 lbs. Thus, the first mode (e.g., mode "1") generally corresponds to weights 0-20 lbs, the second mode (e.g., mode "2") generally corresponds to weights 20-40 lbs, the third mode (e.g., mode "3") generally corresponds to weights 40-60 lbs, the fourth mode (e.g., mode "4") generally corresponds to weights 60-80 lbs, and the fifth mode (e.g., mode "4") generally corresponds to weights 80-100 lbs. This analysis assumes that the first mode starts at zero lb. In alternate embodiments, this assumption need not be followed. A functional relationship can be implemented to define this mapping.

For example, the mode M of the delay line oscillator of the scale can be determined from the estimated weight W' (which is based on the magnetic field strengths measured by the Hall effect sensor IC), the mode weight $W_m$, and a first-order weight $W_s$ based on the frequency (or frequency count) of the delay line oscillator. In embodiments, the first-order weight $W_s$ can be determined from calibration parameters that relate the frequency (or frequency count) of the delay line oscillator and possible other measurements (such as frequency or frequency count of a secondary oscillating signal produced by a reference SAW transducer and/or temperature measured by temperature sensor) to the first-order weight $W_s$. The first-order weight represents the weight of the load assuming that the delay line oscillator is operating in its first mode. In this manner, the first-order weight does not account for mode corrections. Such mode corrections can be applied to the first order weight in the event that the delay line oscillator is operating in the higher modes beyond the first mode (e.g., second mode, third mode, etc.) as described herein. For example, the mode M can be determined from the estimated weight W', the mode weight $W_m$, and the weight $W_s$ as follows:

$$M=(W'-W_s)/W_m\text{ rounded to the nearest integer.}\quad\text{Eqn. (6)}$$

For example, consider the case where $W_m$ is 98.675 lb, W' is 252 lb, and $W_s$ is 34.323 lb. In this example, M is derived from (252−34.323)/98.675=2.206. This will get rounded to a value of M of 2.

The value of the mode M can be used for mode-correction to determine the weight on the scale based on the weight $W_s$ and the mode. For example, the weight on the scale $W_v$ can be determined from the weight $W_s$ and the mode as follows:

$$\text{Weight on scale}=W_v=(M*W_m)+W_s.\quad\text{Eqn. (7)}$$

For the example above, the application of Eqn. (7) would determine a weight on the scale of (2*98.675 lb)+34.323 lb=197.350 lb+34.323=231.673 lb.

Moreover, the measurements of magnetic field performed by the Hall effect sensor IC can be used to determine a correction factor for determining weight on the scale that accounts for off-center loading. More specifically, the measurements of axial magnetic field strength in the Y axis and the X axis as provided by the Hall effect sensor IC can provide an estimation of where the center of gravity of the load is on the scale based on the ratio of the values of the Y axis and the X axis readings. The ratio of the values of the Y axis and the X axis readings can be combined with a parameter L to provide a correction to the calculated weight that accounts for off-center loading based on the following expression:

$$\text{Weight corrected for off-center loading} = W_O = (L*[x/y]*W_V) + W_V, \quad \text{Eqn. (8)}$$

where "y" is the magnetic field strength in the Y-axis as measured by the Hall effect sensor IC with the unknown weight on the scale, and "x" is the magnetic field strength in the X-axis as measured by the Hall effect sensor IC with the unknown weight on the scale.

In this embodiment, the parameter L can be correlated by calibration operations of Y axis and the X axis readings of the Hall effect sensor IC of the scale with off-center loading of known weights.

Furthermore, the measurements of magnetic field performed by the Hall effect sensor IC can be used to determine whether the first delay line oscillator circuit of the scale is operating in a predefined desired mode. An such determine can be used to selectively control the push oscillator to inject an oscillating voltage signal into the delay line oscillator circuit such that delay line oscillator circuit operates in the predefined desired mode in the event that the first delay line oscillator circuit is not operating in the predefined desired mode.

In embodiments, calibration operations can determine and store calibration data that relates measurements of magnetic field performed by the Hall effect sensor to predefined desired modes of the first delay line oscillator circuit. Such calibration data can be accessed during operation to determine whether the first delay line oscillator circuit is operating in the predefined desired mode corresponding to the measurements of magnetic field performed by the Hall effect.

Figure 3C:
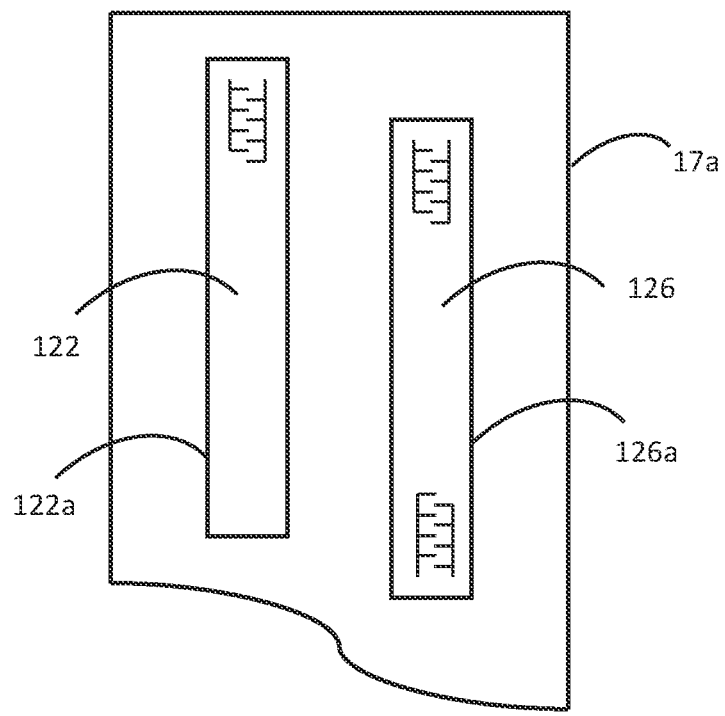
FIG. 3C is a schematic plan view of the piezoelectric transducers mounted on holder 17a of FIG. 3A.
Figure 3D:
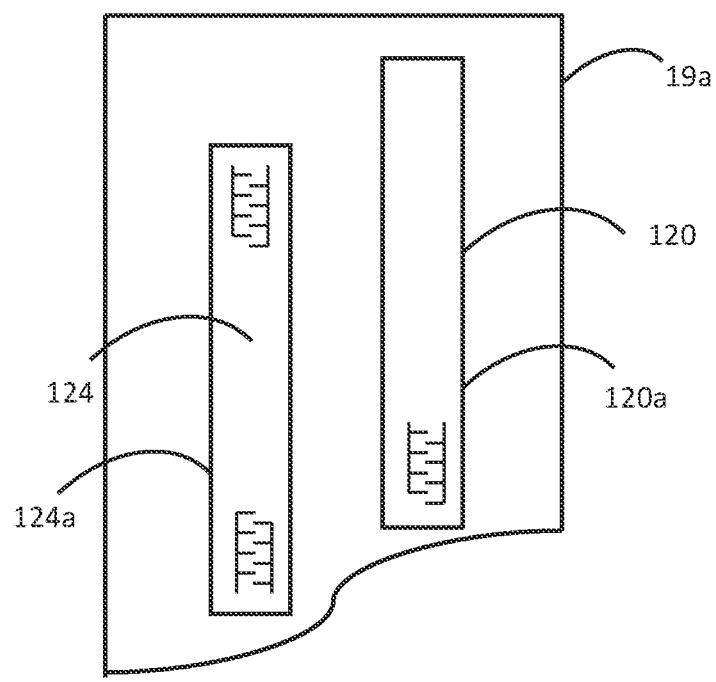
FIG. 3D is a schematic plan view of the piezoelectric transducers mounted on holder 19a of FIG. 3A.

Turning now to FIGS. 3A to 3D, an exemplary embodiment of the piezoelectric transducers of the scale is shown. The piezoelectric transducers include a Weight SAW transmitter transducer 120 that has a pair of interdigitated electrodes formed on a surface of the piezoelectric substrate 120a, which is mounted on surface 19c of the holder 19a. The piezoelectric transducers also include a Weight SAW receiver transducer 122 that has a pair of interdigitated electrodes formed on a surface of a piezoelectric substrate 122a, which is mounted on a surface 17c of the holder 17a opposite the Weight SAW transmitter 120a and separated by a small gap. A Hall effect sensor IC 152 is also mounted on the surface 19c of the holder 19a. A magnet 154 is mounted on the surface 17c of the holder 17 opposite the Hall effect sensor IC 152 and separated by the small gap. The piezoelectric transducers also include a First Reference SAW transducer 124 and a Second Reference SAW transducer 126. Both the First Reference SAW transducer 124 and the Second Reference SAW transducer 126 include interdigitated transmitter electrodes and interdigitated receiver electrodes formed on surfaces of respective piezoelectric substrates 124a, 126a, respectively as best shown in FIGS. 3C and 3D. The substrate 124a of the First Reference SAW transducer 124 is mounted on the surface 19c of the holder 19a. The substrate 126a of the Second Reference SAW transducer 126 is mounted on the surface 17c of the holder 17a.

In embodiments, the piezoelectric substrates of the piezoelectric transducers can be made of lithium niobate. Furthermore, the piezoelectric substrates 120a, 122a of the Weight SAW transmitter transducer 120 and the Weight SAW receiver transducer 122 can be arranged substantially parallel to one another with the gap between them. The holders 17a, 19a can be made of blocks of aluminum or other suitable metal.

Reflected waves may occur on both piezoelectric substrates and such reflected waves can interfere with the propagation of the SAW and cause unwanted non-linearity in the system response. In embodiments, the piezoelectric transducers can employ anti-reflection structures as taught in U.S. Pat. No. 5,910,647, commonly assigned to assignee of the present application and herein incorporated by reference in its entirety.

Figure 4:
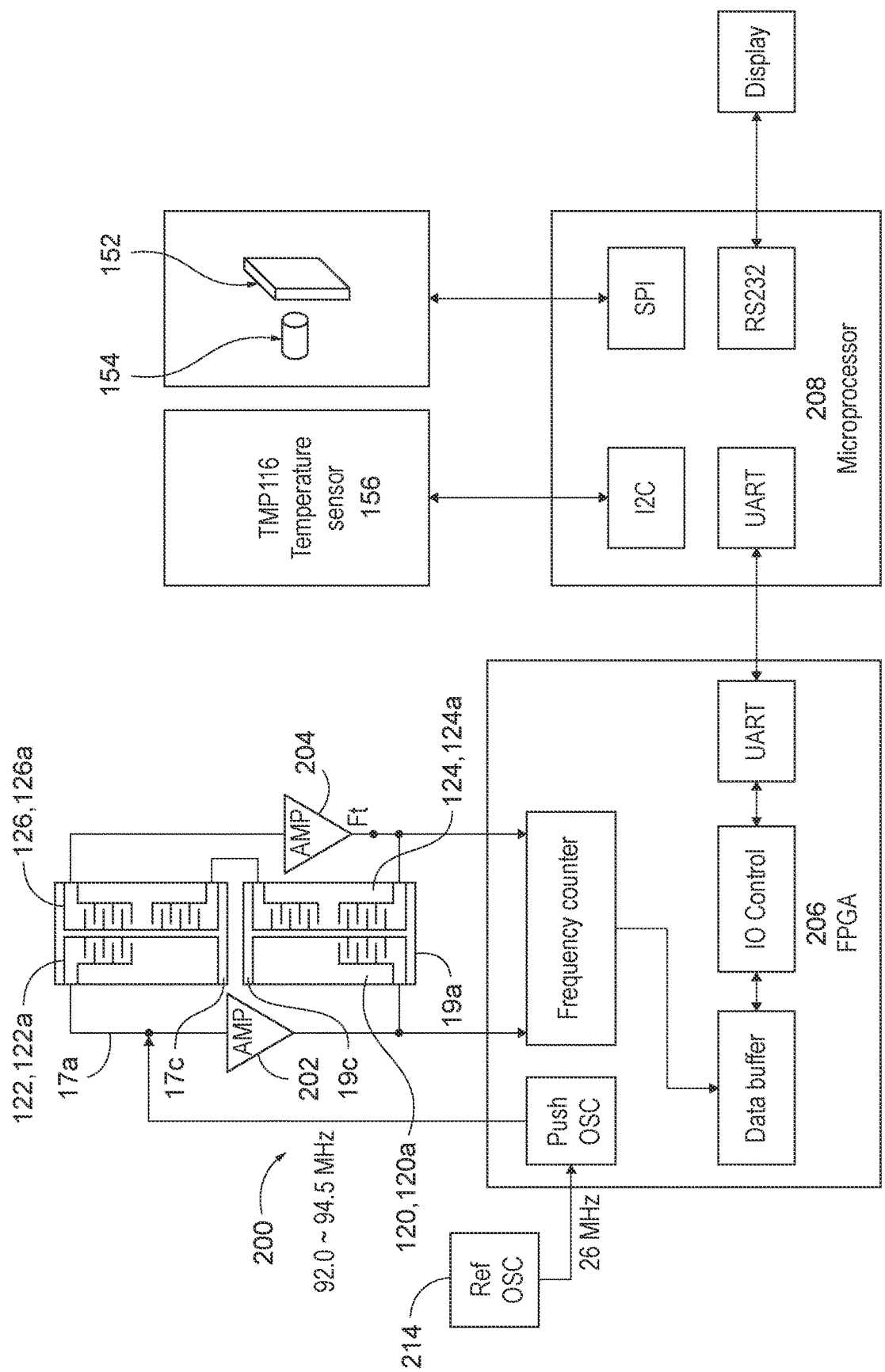
FIG. 4 is a simplified schematic diagram of circuits used in the electronic weighing apparatus according to the present disclosure.

In an exemplary embodiment shown in FIG. 4, the electronic system of the scale includes an amplifier 202 operably coupled between the Weight SAW receiver transducer 122 and the Weight SAW transmitter transducer 120. The output of amplifier 202 is supplied to the interdigitated electrodes of the Weight SAW transmitter transducer 120, which causes the Weight SAW transmitter transducer 120 to function as a transmitter transducer and emit a surface acoustic wave ("SAW") which propagates along the surface of the piezoelectric substrate 120a. This propagating surface acoustic wave is transmitted over the gap between the piezoelectric transducers 120, 122 and induces a similar propagating surface acoustic wave along the surface of the opposed piezoelectric substrate 122a. The Weight SAW receiver transducer 122 functions as a receiver transducer that generates an oscillating voltage signal which is induced by the propagating surface acoustic wave traveling along the surface of the piezoelectric substrate 122a. The oscillating voltage signal produced by the interdigitated electrodes of the Weight SAW receiver transducer 122 is supplied as an input to the amplifier 202. In this manner, the Weight SAW transmitter transducer 120 and the Weight Saw receiver transducer 122 form a "delay line" and the gain of the amplifier 202 is configured to be larger than the loss of the system such that the resulting circuit acts as a natural oscillator with the output of the amplifier 202 producing an oscillating voltage signal having a particular frequency which depends on the physical characteristics of the piezoelectric transducers and their distance relative to each other. In particular, the frequency of the oscillating voltage signal produced by the output of the amplifier 202 of the delay line oscillator is directly related to the time it takes for the surface acoustic wave to propagate from the electrodes 120a to the electrodes 122a. The oscillating signal produced at the output of the amplifier 202 is also supplied to a frequency counter circuit that is implemented as part a field-programmable gate array (FPGA) 206. The frequency of the oscillating signal can be measured by the frequency counter and stored in a data buffer that is implemented as part the FPGA 206. The frequency data representing the frequency of the oscillating signal (which is also referred to as "Weight Saw Frequency" herein) as stored in the data buffer can be communicated to a microprocessor 208 by Input-Output (TO) control circuitry and a UART interface that is implemented as part of the FPGA 206. The microprocessor 208 can use such frequency data (or a change in such frequency data) for the weight determination of the apparatus as described herein.

Note that the accuracy of the weight determination can be affected by phase linearity and non-linearity and drift due to environmental conditions including temperature and/or humidity. Phase linearity represents the linear relationship between the frequency response of the oscillating voltage signal produced by the output of the amplifier 202 and the relative displacement of the piezoelectric transducers 120, 122. Phase non-linearity represents the non-linear relationship between the frequency response of the oscillating voltage signal produced by the output of the amplifier 202 and the relative displacement of the piezoelectric transducers 120, 122. In order to account for issues of phase non-linearity, the oscillating voltage signal produced by the output of the amplifier 202 can be configured to oscillate in the mode of best phase linearity by injecting a strong RF signal having a frequency at the midpoint of the desired mode of oscillation. The RF signal can be injected by a push oscillator (labeled "Push OSC") that is implemented as part of the FPGA 206 and coupled to the input of the amplifier 202 as shown in FIG. 4. According to one embodiment, the RF signal has a strength of approximately 100 my as compared to the strength of approximately 10 my for the oscillating signal produced by the Weight SAW receiver transducer 122. The RF signal may be injected as bursts for a short time (as short as 0.01 seconds) before each weight measurement such that the operation of the push oscillator does not affect the operations of the delay line oscillator.

The "push oscillator" can be supplied with a reference oscillating clock signal, e.g. a 26 MHz clock signal, generated by a reference oscillator as shown in FIG. 4. For example, the reference oscillator can be a crystal oscillator or other oscillator as is well known in the electrical arts. In embodiments, the push oscillator of the FPGA 206 can be realized by a phased-lock loop synthesizer circuit with divide-down counter as is well known in the electronic arts. In this case, microprocessor 208 can control the frequency of the phased-lock loop synthesizer by control parameters supplied to the divide-down counter of the synthesizer circuit via the UART interface and the IO control circuit of the FPGA 206.

According to another aspect, the effects of environmental conditions on the frequency response of the oscillating voltage signal produced by the output of the amplifier 202 can be accounted for by generating a reference oscillating signal by operation of the First Reference SAW transducer 124 and the Second Reference SAW transducer 126 and a secondary amplifier 204. In this case, the First Reference SAW transducer 124 and the Second Reference SAW transducer 124 are electrically connected to one another in series as shown in FIG. 4. The First Reference SAW transducer 124 initially functions as a secondary receiver transducer that generates a secondary oscillating voltage signal which is induced by propagation of a secondary SAW traveling along a surface of the piezoelectric substrate 124a. The secondary oscillating voltage signal produced by the First Reference SAW transducer 124 is supplied as an input to the Second Reference SAW transducer 126 via the series connection, which induces a propagating SAW traveling along a surface of the piezoelectric substrate 126a and regenerates the secondary oscillating voltage signal based on the propagating SAW. The secondary oscillating voltage signal regenerated by Second Reference SAW transducer 126 is supplied as input to the secondary amplifier 204. The output of the secondary amplifier 204 is supplied as input to the First Reference SAW transducer 124, which causes the First Reference SAW transducer 124 to induce propagation of the secondary SAW traveling along the surface of the piezoelectric substrate 124a and regenerate the secondary oscillating voltage signal based on the propagating secondary SAW. The secondary oscillating voltage signal produced by the First Reference SAW transducer 124 is supplied as an input to the Second Reference SAW transducer 126 via the series connection, and the secondary oscillating voltage signal regenerated by Second Reference SAW transducer 126 is supplied as input to the secondary amplifier 204 as described above. In this manner, the series-connected First Reference SAW transducer 124 and Second Reference SAW transducer 126 form a secondary "delay line" oscillator and the gain of the secondary amplifier 204 is configured to be larger than the loss of the system such that the resulting circuit acts as a natural oscillator with the output of the secondary amplifier 204 producing an secondary oscillating voltage signal having a particular frequency which depends on the environmental conditions such as temperature and humidity of the system. More specifically, for both the First Reference SAW transducer 124 and the Second Reference Transducer 126, the transmitter and receiver electrodes of the respective transducers are always separated by exactly the same distance. Therefore, one might expect that the secondary delay line should always oscillate at the same frequency. However, environmental conditions, such as temperature and humidity of the air, as well as other factors can affect the speed of propagation of the SAW in both the First Reference SAW transducer 124 and the Second Reference SAW transducer 126. Therefore, any change in the frequency of the secondary delay line oscillator is caused only by these secondary factors, and not by the weight on the scale platform. But one would expect that the primary delay line oscillator of the Weight SAW transmitter transducer 120 and the Weight SAW receiver transducer 122 will also be affected by these secondary factors by the same amount. Therefore, the frequency (or frequency count) of the secondary delay line oscillator can be measured and used to compensate for these secondary factors.

In embodiments, the secondary oscillating signal produced at the output of the secondary amplifier 204 is also supplied to the frequency counter circuit that is implemented as part a field-programmable gate array (FPGA) 206. The frequency of the secondary oscillating signal can be measured by the frequency counter and stored in the data buffer that is implemented as part the FPGA 206. The frequency data representing the frequency of the secondary oscillating signal (which is also referred to as "Reference Saw Frequency" herein) as stored in the data buffer can be communicated to the microprocessor 208 by Input-Output (TO) control circuitry and that UART interface that is implemented as part the FPGA 206. The microprocessor 208 can use such frequency data (or a change in such frequency data) to automatically adjust the weight determination of the apparatus to compensate for the secondary factors including environmental conditions.

Note that the frequency of the secondary oscillating signal does not account for effect of temperature on the Young's modulus of the elastic member of the scale. In order to account for these temperature effects, a temperature sensor 156 can be provided that interfaces to the microprocessor 208 by a suitable interface (such as I2C). The microprocessor 208 can receive temperature data from the temperature sensor 156 and use such temperature data to automatically adjust the weight determination of the apparatus for these temperature effects on the apparatus. In embodiments, the temperature sensor 156 can be a thermometer IC or other suitable temperature sensor.

The magnet 154 produces a magnetic field directed across the gap for detection by the Hall effect sensor IC 156. The magnet 154 can be a permanent magnet, magnet array or other suitable source of the magnetic field. When a load is applied to the load platform 16 for weight measurement, the cantilevered elastic member 14 moves and causes relative displacement between the magnet 154 and the Hall effect sensor IC 156. The relative displacement of the magnet 154 and the Hall effect sensor IC 156 causes a change in the magnetic field strength measured by the Hall effect sensor IC 156. The Hall effect sensor IC 156 can interface to the microprocessor 208 by a suitable interface (such as SPI). The microprocessor 208 can receive data representing the magnetic field strength measurements made by the Hall effect sensor IC 156 over this interface. Calibration operations can be carried out to correlate the magnetic field strength (or change therein) as measured by the Hall effect sensor IC 156 to the frequency response of the delay line oscillator of the scale so that the mode of the delay line oscillator can be determined. In other words, different loads on the platform 16 can produce the same or similar frequency response in the delay line oscillator such that a weight determination cannot be made unless the mode is known. Because the magnetic field strength (or change therein) as measured by the Hall effect sensor IC 156 has a one-to-one correspondence to weight (i.e., it does not have multiple modes), it provides information to permit automatic determination of the mode of the delay line oscillator (i.e., the oscillating signal produced at the output of amplifier 202).

In embodiments, the Hall effect sensor IC 156 can be configured to measure axial magnetic field strength in at least two different axes referred to as "Y axis" and the "X-axis." The Y-axis extends vertically downward parallel to the downward direction of the relative displacement of the piezoelectric transducers. The X-axis is orthogonal to the Y-axis and extends generally parallel to the piezoelectric transducer surfaces that support the propagation of the SAW waves generated by the scale. The Hall effect sensor IC 156 can possibly be configured to measure magnetic field strength in the Z axis if need be. The Z axis is orthogonal to both the Y and X axes and extends in a direction across the gap toward the magnet.

In embodiments, the calibration operations of the Hall effect sensor IC 156 can be logically organized into two parts referred to herein as off-center calibration and span calibration as described herein.

In embodiments, the Hall effect sensor IC 152 can include a thin substrate of p-type semiconductor material, such as gallium arsenide (GaAs), indium antimonide (InSb) or indium arsenide (InAs). When a continuous current is flowing through the substrate and the sensor is placed within a magnetic field, the magnetic flux lines exert a force on the semiconductor material which deflects the charge carriers (electrons and holes) to either side of the semiconductor substrate. This movement of charge carriers is a result of the magnetic force they experience passing through the semiconductor material. The movement of the charge carriers produces a potential difference between the two sides of the semiconductor material by the build-up of these charge carriers. When the movement of electrons through the semiconductor material is affected by the presence of an external magnetic field which is at right angles to it, this effect is greater in a flat rectangular shaped material. The effect of generating a measurable voltage by using a magnetic field is called the Hall Effect after Edwin Hall who discovered it back in the 1870's with the basic physical principle underlying the Hall effect being Lorentz force. To generate a potential difference across the device, the magnetic flux lines must be perpendicular, (90°) to the flow of current and be of the correct polarity, generally a south pole. Generally, Hall Effect sensors and switches are designed to be in the "OFF", (open circuit condition) when there is no magnetic field present. They only turn "ON", (closed circuit condition) when subjected to a magnetic field of sufficient strength and polarity. The output voltage, called the Hall voltage, of the material is directly proportional to the strength of the magnetic field passing through the semiconductor material (output∝H). This output voltage can be quite small, only a few microvolts even when subjected to strong magnetic fields so most commercially available Hall effect sensors include built-in DC amplifiers, logic switching circuits and voltage regulators to improve the sensors sensitivity, hysteresis and output voltage. This also allows the Hall effect sensor to operate over a wider range of power supplies and magnetic field conditions. Furthermore, Hall effect sensors are generally available with either linear or digital outputs. The output signal for linear (analogue) sensors is taken directly from the output of the operational amplifier with the output voltage being directly proportional to the magnetic field passing through the Hall sensor.

Figure 5:
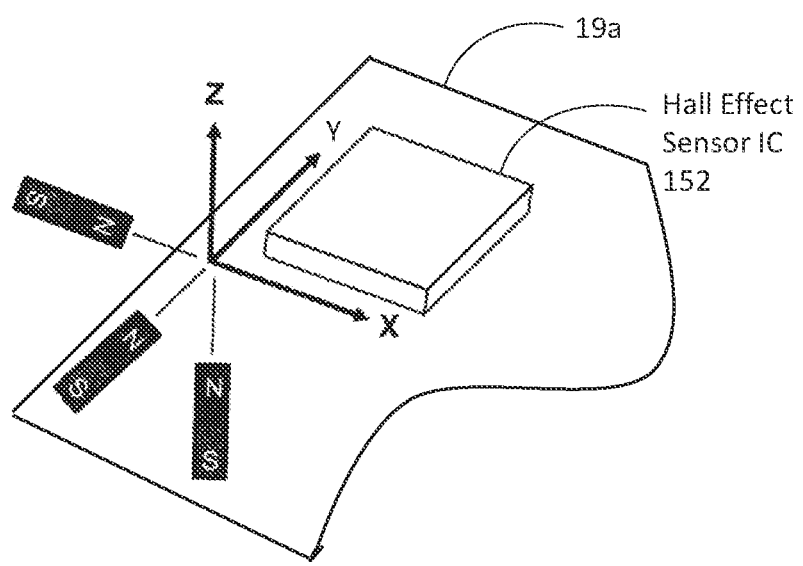
FIG. 5 is a schematic diagram of the Hall effect sensor integrated circuit that is used in the electronic weighing apparatus according to the present disclosure.

In embodiments, the Hall effect sensor IC 152 can be a 3D-Hall effect sensor IC, such as the AK09970N sensor sold commercially by AKM Semiconductor, Inc. of San Jose, CA. The 3D-Hall effect sensor IC can be configured to measure and record digital values corresponding to the magnetic field measured in each of the X,Y,Z axes of a Cartesian reference frame as shown in FIG. 5. The sensor includes a serial (SPI) interface that can interface to the microprocessor 208 to read the digital values for the X,Y,Z magnetic field measurements recorded by the sensor. Other suitable 3D Hall-effect sensor ICs can also be used.

In embodiments, the frequency of the oscillating voltage signal produced by the output of the amplifier 202 is in the range of 92-94.5 MHz In order to limit loss in the system, the gap between the Weight SAW transmitter 120a and Weight SAW receiver 122a can be kept small.

Figure 6:
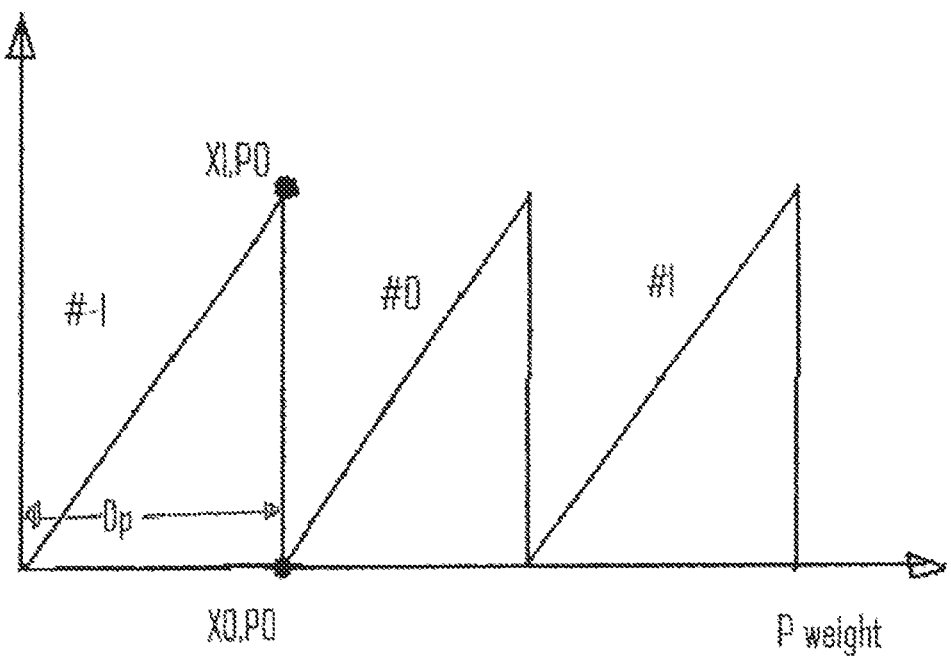
FIG. 6 is a plot of a portion of a frequency response curve for a delay line oscillator according to the present disclosure, which shows modes of oscillation delay line oscillator.

The frequency response of the oscillating voltage signal produced by the output of the amplifier 202 over the operating load range of the scale can be represented by a periodic sawtooth profiled curve as shown in FIG. 6, where the different tooth's of the curve are defined by distinct frequency ranges and correspond to different modes of the delay line oscillator of the system. Thus, as the frequency of the oscillating voltage signal changes due to different load conditions, the modes can move through the periodic sawtooth profiled curve. Importantly, because of the sawtooth profile of the curve, the frequency response over the operating load range of the scale includes the same frequencies generated at different displacements of the elastic member such that a weight determination cannot be made unless the mode is known. Thus, the weight determination performed by the microprocessor 208 based on the frequency measured by the frequency counter of the FPGA 206 (or change to such frequency) requires determination of the mode of the delay line oscillator of the system, i.e., which tooth of the curve the delay line oscillator is operating in.

Figure 7:
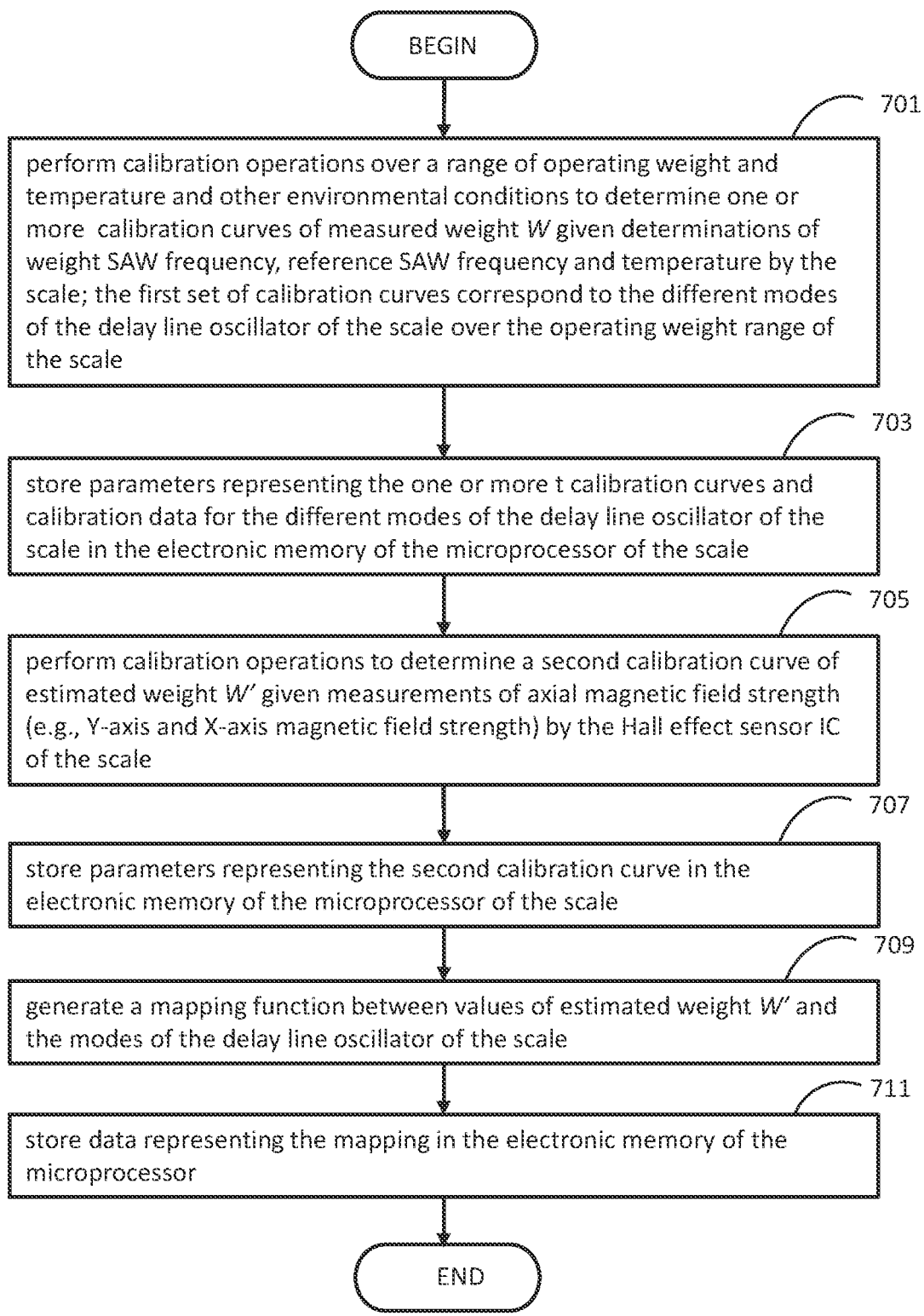
FIG. 7 is a flow chart illustrating exemplary calibration operations carried out for the electronic weighing apparatus according to the present disclosure.

In embodiments, the scale can be calibrated as shown in FIG. 7. The operations being in block 701, where calibration operations can be performed over a range of operating weight and temperature and other environmental conditions to determine one or more calibration curves of measured weight W given determinations of weight SAW frequency (or frequency count), reference SAW frequency (or frequency count) and temperature by the scale. The one or more calibration curves correspond to the different modes of the delay line oscillator of the scale over the operating weight range of the scale. Such calibration operations can involve readings made by the scale with known weights distributed over the operating weight range of the scale. The known weights can be selected such that at least two readings are performed for each mode of the delay line oscillator of the scale. Furthermore, the readings can be repeated over varying temperature and other environmental conditions. For each reading, the weight SAW frequency, reference SAW frequency and temperature of the scale is measured and recorded by the microprocessor 208. The measurements of weight SAW frequency, reference SAW frequency and temperature can be correlated to the known weights to provide one or more calibration curves that correspond to the different modes of the delay line oscillator of the scale over the operating weight range of the scale. In one embodiment, the calibration operations of block 701 correlate a first-order weight $W_s$ to the weight SAW frequency (or frequency count), the reference SAW frequency (or frequency count) and the temperature of the scale. The first-order weight $W_s$ represents the weight of the load assuming that the delay line oscillator provided by the weight SAW transducer is operating in its first mode. In this manner, the first-order weight $W_s$ does not account for mode corrections. The calibration operations can also correlate mode corrections to weight SAW frequency (or frequency count), reference SAW frequency (or frequency count) and temperature of the scale over the modes of the scale. Such mode corrections can be applied to the first order weight $W_s$ in the event that the delay line oscillator provided by the weight SAW transducer is operating in the higher modes beyond the first mode (e.g., second mode, third mode, etc.).

In block 703, the microprocessor 208 stores parameters representing the one or more calibration curves and calibration data for the different modes of the delay line oscillator of the scale in the electronic memory of the microprocessor 208.

In block 705, calibration operations are performed to determine a second calibration curve of estimated weight W' given measurements of axial magnetic field strength (e.g., Y-axis and X-axis magnetic field strength) by the Hall effect sensor IC 153 of the scale. In embodiments, the calibration operations of the Hall effect sensor IC can include off-center calibration and span calibration operations as described above with readings recorded by the microprocessor 208.

In block 707, the microprocessor 208 stores parameters representing the second calibration curve in the electronic memory of the microprocessor 208.

In block 709, the microprocessor 208 generates a mapping function (or other functional relationship) between values of estimated weight W' and the modes of the delay line oscillator of the scale. In embodiments, the mapping function can be implemented by a table or other suitable data structure implemented by the microprocessor 208. In embodiments, the microprocessor can generate the mapping function operations as described above with readings recorded by the microprocessor 208.

In block 711, the microprocessor 208 stores data representing the mapping function in the electronic memory of the microprocessor 208.

Note that it is expected that the operations of blocks 701-711 will be carried out by the system manufacturer or other authorized party as part of a "factory calibration" before shipping the scale to the customer. Blocks 701 and 703 may only be performed once, although such operations can be repeated if necessary. And blocks 705 to 711 can also be performed only once, although such operations can be repeated if necessary. In this case, any or all of the calibration operations can be performed after using the scale in order to re-calibrate the scale for accurate weight determination.

Figure 8:
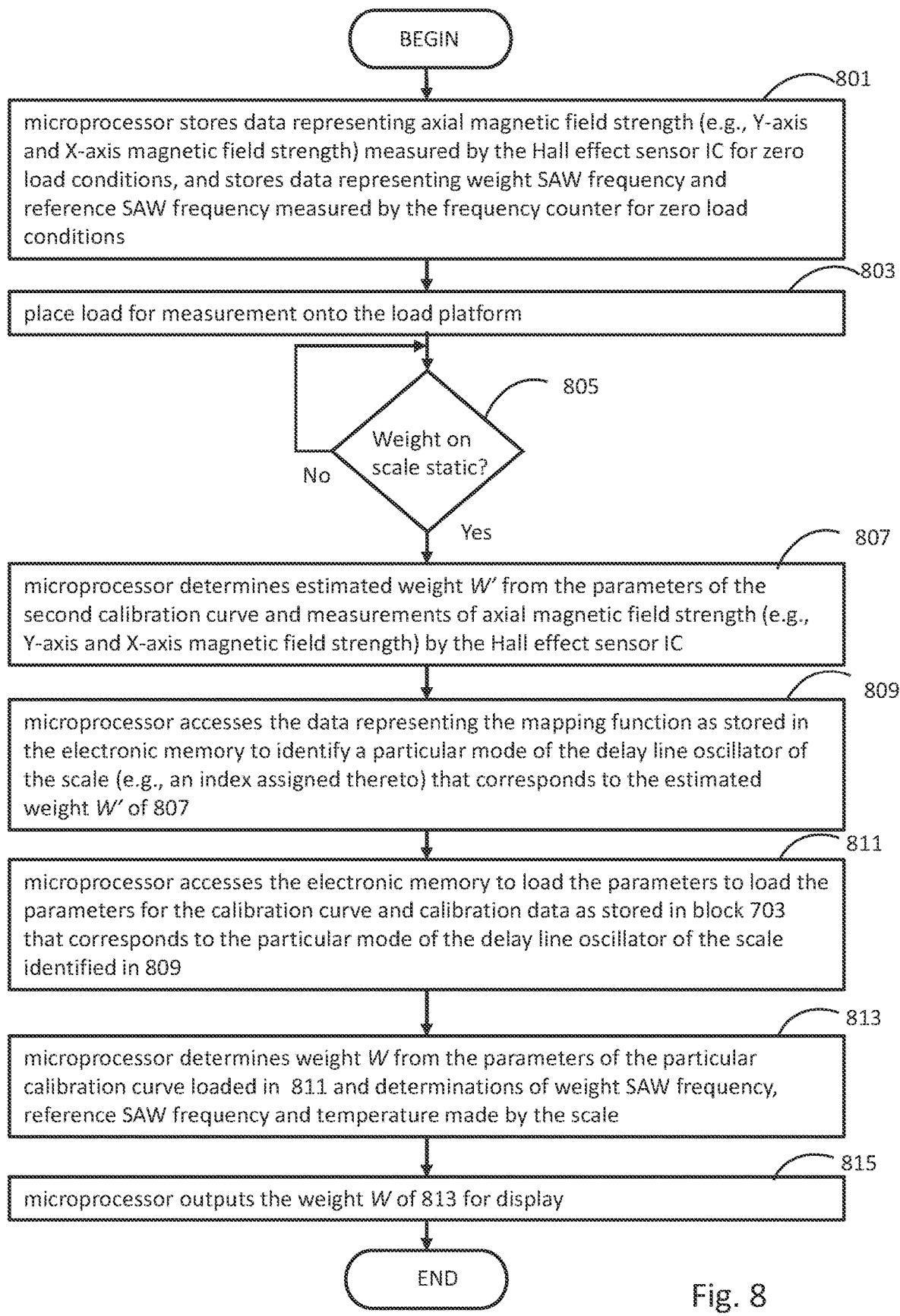
FIG. 8 is a flow chart illustrating exemplary weight determination operations performed by the electronic weighing apparatus according to the present disclosure.

In embodiments, the scale can perform weight determination as shown in FIG. 8. The operations begin in block 801 where the microprocessor 208 stores data representing axial magnetic field strength (e.g., Y-axis and X-axis magnetic field strength) measured by the Hall effect sensor IC 153 for zero load conditions (without any load on the platform 16). The microprocessor 208 also stores data representing weight SAW frequency and reference SAW frequency measured by the frequency counter of the FPGA 206 for the zero load conditions.

In block 803, a load is placed onto the load platform 16 for measurement.

In block 805, the microprocessor 208 checks whether the weight on the scale is static. Such operations can evaluate the data representing axial magnetic field strength (e.g., Y-axis and/or X-axis magnetic field strength) measured by the Hall effect sensor IC 153 and/or the data representing weight SAW frequency and/or reference SAW frequency measured by the frequency counter of the FPGA 206 to determine that such data is varying within a predetermined tolerance level that is configured to indicate that the weight on the scale is static.

In block 807, the microprocessor 208 determines an estimated weight W' from the parameters of the second calibration curve stored in the electronic memory of the microprocessor (block 707) and measurements of axial magnetic field strength (e.g., Y-axis and X-axis magnetic field strength) by the Hall effect sensor IC 152.

In block 809, the microprocessor 208 accesses the data representing the mapping function as stored in the electronic memory (block 711) to identify a particular mode of the delay line oscillator of the scale (e.g., an index assigned thereto) that corresponds to the estimated weight W' of 807.

In embodiments, the microprocessor 208 can determined whether the particular mode identified in 809 corresponds to a predefined desired mode for the unknown weight. For example, in some circumstances, the operating mode of the scale during weight determination can diverge from the desired mode and adversely impact the accuracy of the weight determination. In order to detect this condition, the microprocessor 208 can identify the predefined desired mode of the scale that corresponds to the unknown weight based on the measurements of axial magnetic field strength (e.g., Y-axis and X-axis magnetic field strength) by the Hall effect sensor IC 152. Furthermore, the microprocessor 208 can be configured to use the results of such determine to selectively control the push oscillator to inject an oscillating voltage signal into the delay line oscillator circuit of Weight SAW transmitter 120a and Weight SAW receiver 122a such that delay line oscillator circuit operates in the predefined desired mode in the event that the first delay line oscillator circuit is not operating in the predefined desired mode. Such injection can be carried out to adjust the mode of the delay line oscillator circuit before measuring the weight SAW frequency and reference SAW frequency that are used for the determination of block 813.

In embodiments, calibration operations (such as calibration operations in addition to those of FIG. 7) can be carried out to determine and store calibration data that relates measurements of magnetic field performed by the Hall effect sensor to predefined desired modes of the first delay line oscillator circuit. Such calibration data can be stored in the electronic memory of the microprocessor 208 and accessed during operation to determine whether the delay line oscillator circuit is operating in the predefined desired mode corresponding to the measurements of magnetic field performed by the Hall effect sensor IC.

In block 811, the microprocessor 208 accesses the electronic memory to load parameters for the calibration curve and calibration data as stored in block 703 that corresponds to the particular mode of the delay line oscillator of the scale identified or adjusted to in 809.

In block 813, the microprocessor 208 determines a weight W from the parameters of the particular calibration curve loaded in 811 and determinations of weight SAW frequency, reference SAW frequency and temperature made by the scale. In embodiments, changes to the SAW frequency relative to the no load condition (block 801), changes to the reference SAW frequency relative to the no load condition (block 801) and the temperature of the system are input to the particular calibration curve to determine a first-order weight $W_s$. Mode-correction is then applied to the first-order weight $W_s$ based on the calibration data of 811, the mode weight $W_m$ for the scale, and the mode M of particular mode of the delay line oscillator of the scale as identified in 809 to determine the weight W. In embodiments, the mode-correction can employ values for one or more correction factors or parameters, such as a value for a correction factor or parameter that is calculated from the reference SAW frequency or change related thereto in order to account for environmental conditions as well as a as a value for an additional correction factor or parameter that is calculated from the temperature in order to account for temperature effects on the elastic member of the scale. Furthermore, the determination of weight W can involve correction for off-center loading (e.g., Eqn. (8)).

In block 815, the microprocessor 208 outputs the weight W of 813 for display.

In other embodiments, the magnetic field strength measurements of the Hall effect sensor IC can be integrated into other electronic scales, such as the electronic scales employing SAW transducers as described in U.S. Pat. Nos. 9,477, 638, 6,448,513, 5,910,640, and 663531, herein incorporated by reference in their entireties. Furthermore, the magnetic field strength measurements of the Hall effect sensor IC can be integrated into other calibration operations and/or other weight determination operations performed by an electronic scale, such as the electronic scales employing SAW transducers as described in the U.S. Pat. Nos. 9,477,638, 6,448, 513, 5,910,640, and 663531 incorporated by reference above.

Figure 9:
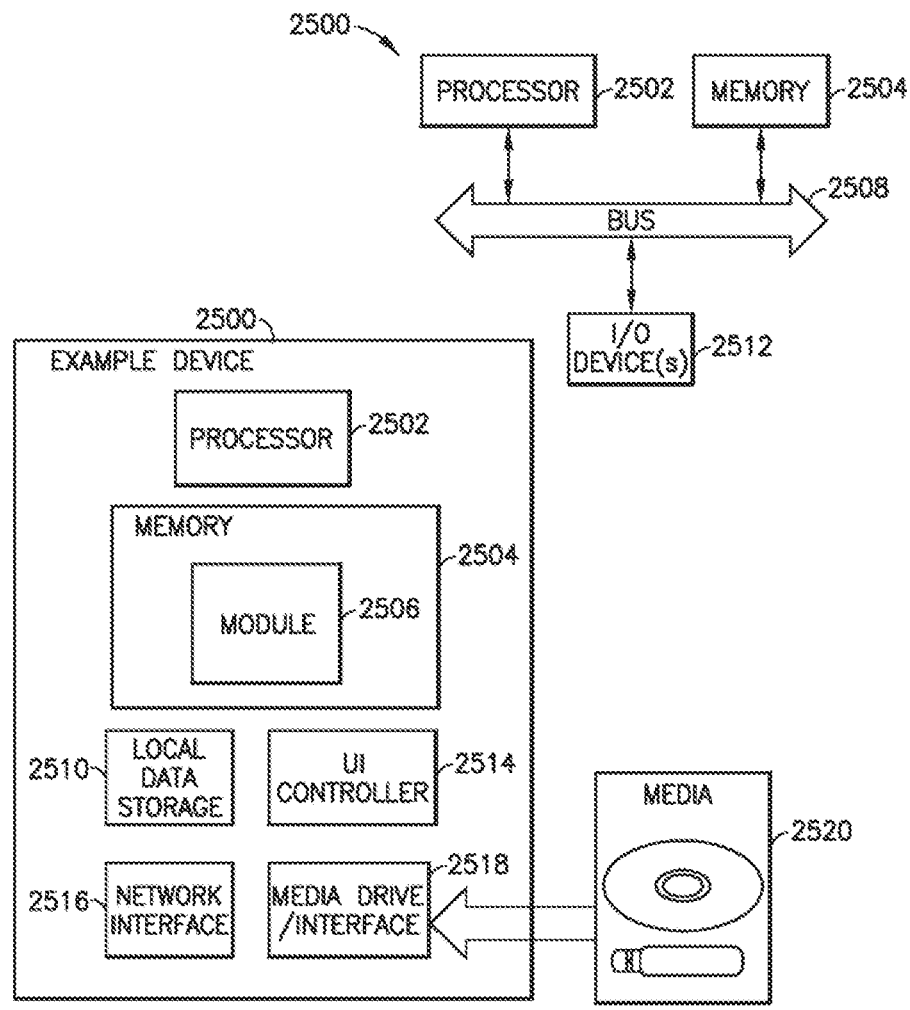
FIG. 9 is a functional block diagram of a processor-based system that can implement part of the electronic weighing apparatus according to the present disclosure.

FIG. 9 illustrates an example device 2500, with a processor 2502 and memory 2504 that can be configured to implement various embodiments of the methods and systems described herein, including functionality and operations carried out by the microprocessor of the scale. Memory 2504 can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human operator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the method as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium, preloaded with a computer system (e.g., on system ROM or fixed disk), or distributed from a server over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

There have been described and illustrated herein several embodiments of SAW scale improvements and related methods. While particular embodiments have been described, it is not intended that the disclosure be limited thereto, and it is intended that the invention be as broad in scope as the art will allow and that the specification be read likewise. Thus, while particular frequency difference values were described as being utilized, it will be understood that other values for these variables will be specific for the particular scale. Further, it will be understood that equivalent parts may be used for the described elements. For example, any suitable processor may be used as the "microprocessor". It will therefore be appreciated by those skilled in the art that yet other modifications could be made without deviating from the spirit and scope of the invention.

What is claimed is:

1. An electronic weighing apparatus for determining weight of a load, comprising:
    a displaceable elastic member that is displaced by the load such that displacement of the elastic member is related to the weight of the load;
    a first piezoelectric transducer comprising a first surface acoustic wave (SAW) transmitter spaced from a first SAW receiver, said first piezoelectric transducer being coupled to said elastic member;
    a first amplifier having an input and an output, said input of said first amplifier being coupled to said first SAW receiver and said output of said first amplifier being electrically coupled to said first SAW transmitter such that said first SAW receiver, said first amplifier and said first SAW transmitter form a first delay line oscillator circuit that is configured to generate a first oscillating signal in response to displacement of said elastic member;
    a magnet spaced from a Hall effect sensor, wherein the magnet is configured to produce a magnetic field and the Hall effect sensor is configured to measure strength of the magnetic field which is related to displacement of said elastic member and the weight of the load;
    circuitry operably coupled to the first delay line oscillator circuit, wherein said circuitry is configured to generate first frequency data that characterizes frequency of said first oscillating signal, wherein the first frequency data is related to displacement of said elastic member and the weight of the load; and
    a processor operably coupled to the circuitry and the Hall effect sensor, wherein said processor is configured to store calibration data for said electronic weighing apparatus, and wherein said processor is further configured to determine the weight of the load from at least the strength of the magnetic field measured by the Hall effect sensor, the calibration data and the first frequency data;
    wherein the first oscillating signal of the first delay line oscillator circuit is within one mode of a plurality of modes that share frequencies; and
    wherein the processor is configured to store a mapping function that relates data based on strength of the magnetic field as measured by the Hall effect sensor and the plurality of modes and use the mapping function to determine the one mode given the strength of the magnetic field measured by the Hall effect sensor.

2. An electronic weighing apparatus according to claim 1, further comprising:
    at least one additional piezoelectric transducer comprising a second SAW transmitter spaced at a fixed distance from a second SAW receiver;
    a second amplifier having an input and an output, wherein said at least one additional piezoelectric transducer is electrically coupled between the input and output of said second amplifier, said second amplifier and said at least one additional piezoelectric transducer forming a second delay line oscillator circuit that is configured to generate a second oscillating signal; and
    circuitry operably coupled to the second delay line oscillator circuit, wherein said circuitry is configured to generate second frequency data that characterizes frequency of said second oscillating signal, wherein the second frequency data is related to secondary factors including at least one environmental condition;
    wherein the processor is configured to determine the weight of the load from the second frequency data in order to account for the at least one environmental condition.

3. An electronic weighing apparatus according to claim 1, wherein:
    the processor is configured to interface to a temperature sensor that measures temperature data that characterizes ambient temperature; and
    the processor is further configured to use the temperature data to determine the weight of the load from the temperature data in order to account for temperature effect on the elastic member.

4. An electronic weighing apparatus according to claim 1, further comprising:
a push oscillator coupled to processor and to said first delay line oscillator circuit, wherein said push oscillator is configured to initiate oscillation of said first delay line oscillator circuit.

5. An electronic weighing apparatus according to claim 1, wherein:
the processor is configured to store calibration data for the plurality of modes, load particular calibration data for the one mode as determined from the strength of the magnetic field measured by the Hall effect sensor, and use the particular calibration data to determine the weight of the load from at least the particular calibration data and the first frequency data.

6. An electronic weighing apparatus according to claim 5, wherein:
the Hall effect sensor is configured to measure strengths of two axial magnetic field components that are orthogonal to one another;
the mapping function stored by the processor relates variable estimated weight based on strength of the two axial magnetic field component measured by the Hall effect sensor and the plurality of modes; and
the processor is configured to determine as estimated weight given the two axial magnetic field component measured by the Hall effect sensor and use the mapping function to determine the one mode given the estimated weight.

7. An electronic weighing apparatus according to claim 6, wherein:
the Hall effect sensor is mounted on a surface of a mounting structure and the two axial magnetic field components measured by the Hall effect sensor are parallel to the surface of the mounting structure.

8. An electronic weighing apparatus according to claim 6, wherein:
the mapping function is generated by calibration operations that determine the two axial magnetic field components measured by the Hall effect sensor for a load of known weight.

9. An electronic weighing apparatus according to claim 8, further comprising:
a platform for supporting the load, the platform coupled to elastic member, wherein the calibration operations determine the two axial magnetic field components measured by the Hall effect sensor for different positions of the load of known weight on the platform.

10. An electronic weighing apparatus according to claim 8, wherein:
the mapping function involves a parameter that combines the two axial magnetic field components measured by the Hall effect sensor.

11. An electronic weighing apparatus according to claim 6, wherein:
the processor is further configured to determine the weight of the load from the strengths of the two axial magnetic field components measured by the Hall effect sensor in order to account for offset of the load.

12. An electronic weighing apparatus according to claim 11, wherein:
the at least one stored calibration curve is determined from calibration operations that determine at least frequency of the first oscillating signal for loads of different known weights and varying environmental conditions.

13. An electronic weighing apparatus according to claim 1, wherein:
the first oscillating signal of the first delay line oscillator circuit is within one mode of a plurality of modes that share frequencies; and
the processor is further configured to determine a first-order weight of the load based on parameters of at least one stored calibration curve, identify the one mode based on measurements of magnetic field performed by the Hall effect sensor, and apply mode correction to the first-order weight according to the identified one mode to determine the weight of the load.

14. An electronic weighing apparatus according to claim 1, wherein:
the magnet and Hall effect sensor are mounted on opposed mounting structures that are offset from one another by a gap.

15. An electronic weighing apparatus according to claim 14, wherein:
the first SAW transmitter and the first SAW receiver include interdigitated electrodes that are formed on piezoelectric substrates, wherein the piezoelectric substrates are also mounted on the opposed mounting structures.

16. An electronic weighing apparatus for determining weight of a load, comprising:
a displaceable elastic member that is displaced by the load such that displacement of the elastic member is related to the weight of the load;
a first piezoelectric transducer comprising a first surface acoustic wave (SAW) transmitter spaced from a first SAW receiver, said first piezoelectric transducer being coupled to said elastic member;
a first amplifier having an input and an output, said input of said first amplifier being coupled to said first SAW receiver and said output of said first amplifier being electrically coupled to said first SAW transmitter such that said first SAW receiver, said first amplifier and said first SAW transmitter form a first delay line oscillator circuit that is configured to generate a first oscillating signal in response to displacement of said elastic member;
a magnet spaced from a Hall effect sensor, wherein the magnet is configured to produce a magnetic field and the Hall effect sensor is configured to measure strength of the magnetic field which is related to displacement of said elastic member and the weight of the load;
circuitry operably coupled to the first delay line oscillator circuit, wherein said circuitry is configured to generate first frequency data that characterizes frequency of said first oscillating signal, wherein the first frequency data is related to displacement of said elastic member and the weight of the load;
a processor operably coupled to the circuitry and the Hall effect sensor, wherein said processor is configured to store calibration data for said electronic weighing apparatus, and wherein said processor is further configured to determine the weight of the load from at least the strength of the magnetic field measured by the Hall effect sensor, the calibration data and the first frequency data; and a push oscillator coupled to processor and to said first delay line oscillator circuit, wherein said push oscillator is configured to initiate oscillation of said first delay line oscillator circuit;

wherein the processor is configured to determine whether the first delay line oscillator circuit is operating in a predefined desired mode based on the measurements of magnetic field performed by the Hall effect sensor, and selectively control the push oscillator to inject an oscillating voltage signal into the first delay line oscillator circuit such that first delay line oscillator circuit operates in the predefined desired mode in the event that the first delay line oscillator circuit is not operating in the predefined desired mode.

17. An electronic weighing apparatus according to claim 16, wherein:

the processor stores calibration data that relates measurements of magnetic field performed by the Hall effect sensor to predefined desired modes of the first delay line oscillator circuit and accesses such calibration data to determine whether the first delay line oscillator circuit is operating in the predefined desired mode corresponding to the measurements of magnetic field performed by the Hall effect.

18. An electronic weighing apparatus according to claim 16, wherein:

the circuitry and the push oscillator are implemented by a field programmable gate array.

* * * * *